March 31, 1970     I. RUBENSTEIN     3,503,757
METHOD OF PRODUCING A GASIFIED FROZEN CONFECTION
Filed March 29, 1966
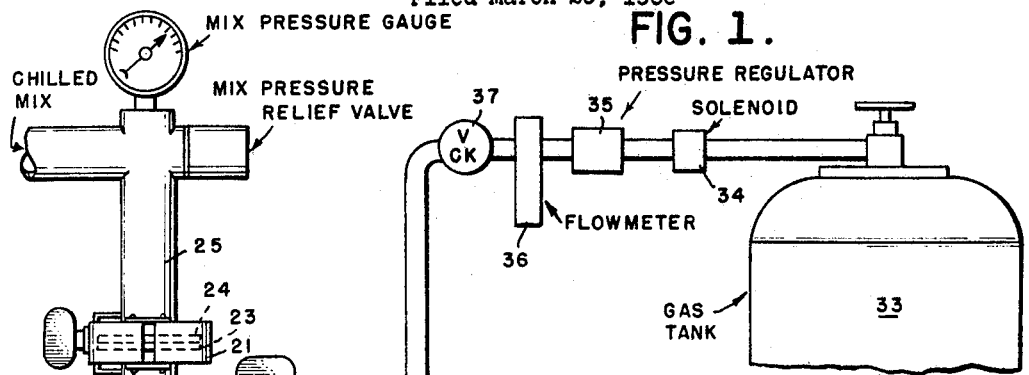
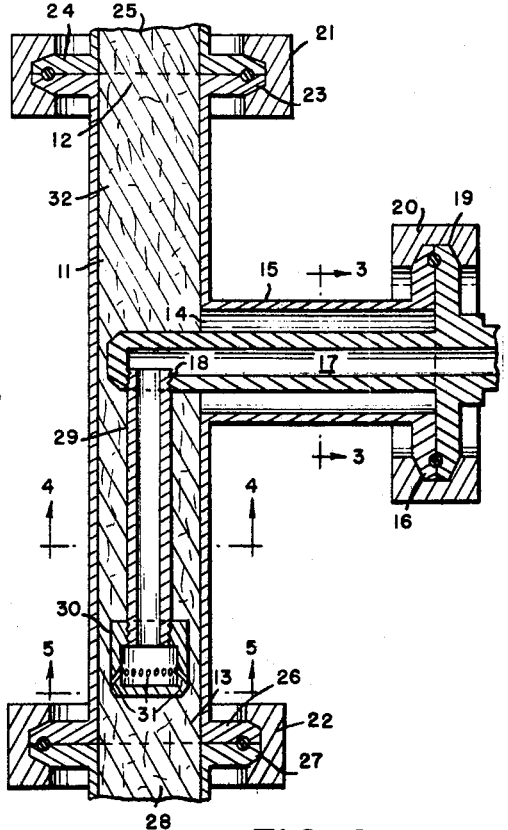
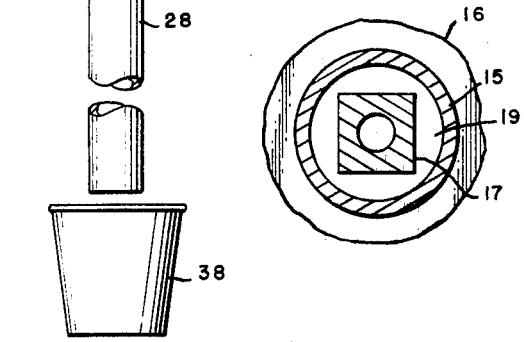
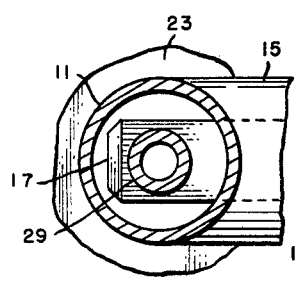
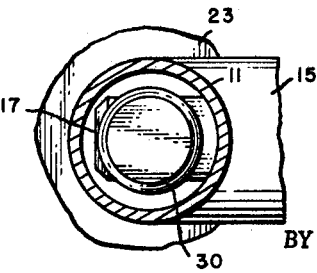
INVENTOR
IRVING RUBENSTEIN
BY Albert J. Kramer
ATTORNEY

United States Patent Office 3,503,757
Patented Mar. 31, 1970

3,503,757
METHOD OF PRODUCING A GASIFIED FROZEN CONFECTION
Irving Rubenstein, Owings Mills, Md., assignor to Maryland Cup Corporation, Owings Mills, Md., a corporation of Maryland
Filed Mar. 29, 1966, Ser. No. 538,381
Int. Cl. A23g 5/00
U.S. Cl. 99—136     5 Claims

ABSTRACT OF THE DISCLOSURE

A conventional chilled ice cream mix is first prepared and then passed in the form of a stream through a treatment zone. Gas with which the mix is to be gasified is then introduced into the stream in finely divided form in the same direction in which the stream flows. The gasified mix is discharged into containers which are subsequently subjected to freezing temperatures.

---

This invention relates to the manufacture of frozen foods and an object is the preparation of a new type of frozen confection having distinctive taste, body and texture.

Another object is the provision of a method of preparing such frozen confection and to apparatus for carrying out the method.

Ice cream, ice milk, sherbets, water ices and other frozen confections have long been made by preparing a basic mix and simultaneously whipping and freezing the mix. Ice cream, ice milk and sherbets are, in general, blends of milk fat, milk-solids-not-fat, sugar, emulsifyer and stabilizer with added flavoring ingredients such as vanilla, chocolate, fruits, nuts, etc. In most cases, the dairy type of mix is pasteurized and also homogenized, so that the resulting emulsion will retain air after whipping and freezing. The incorporation of the air produces a creamy texture with many desirable eating qualities. This air or "overrun," as it is known in the trade, is maintained in the frozen mass until the temperature is allowed to rise. As the frozen confection melts and reverts to its original form, the air is lost and an opaque liquid is left.

Water ices, which are mixtures of water, sugar, stabilizers, whipping aids, such as emulsifiers or proteins, fruit acids and flavors, are not fat emulsions but relay on the stabilizers and whipping aids to maintain their air structure during the whipping-freezing operation. The maintenance of this structure presents many difficulties, in that the amount of stabilizer and whipping aid must be (1) low enough to provide a cooling taste sensation without gelatinous mouth feel and (2) high enough to retain the incorporated air. As a matter of practical plant procedure, many ice cream companies avoid making water ices because of the exacting control necessary for proper manufacture.

Conventional ice cream freezers designed for such processes are, generally, of one of two types. In one type the basic mix is run through a first stage pump that, in turn, feeds a second stage pump which feeds the barrel where the whipping-freezing process occurs. The second stage pump is operated faster than the first stage pump to create a volumetric difference between the outlet of the first stage and the inlet of the second stage. The balance of volume need for the inlet of the second stage is supplied by air sucked in through a valve on the line between the two stages.

The second type of freezer relies on an air pump to discharge air directly into the freezing chamber in such quantities that the whipping-freezing stage will have proper proportions of air and liquid mix. The size of the air particles in the frozen confection are a function of whipping time, mix vicosity, refrigerant temperatures and many other variables.

In the conventional preparation of frozen confections, air is used since, in general, it has no flavor of its own, is cheap and has limited solubility in water, but its specific gravity is relatively low so that it quickly evaporates from a frozen state as the temperature rises to the melting point. Adding no flavor of its own, air furnishes only body and texture to the finished product.

According to the present invention, a relatively high specific gravity gas, such as carbon dioxide or nitrous oxide, is added to a confection mix in such a way as to provide a product having a distinct flavor, texture and body.

In general, a suitable chilled mix is prepared in a semi-fluid form and forced under continuous pressure through a mixing chamber which is maintained filled with the mix as it passes therethrough. On the interior of the chamber, the high specific gravity gas is introduced under positive continuous pressure from an exterior source into the flowing stream of the mix. The gas is injected in minute subdivided streams flowing concurrently with the mix in the chamber. The resulting combination of mix and gas is then recovered on the exterior of the mixing chamber, whereupon it is packaged in containers and frozen. It is maintained in the frozen condition until consumed.

However, if desired, the frozen product may be permitted to thaw in its container. Where carbon dioxide is used as the gas, a carbonated beverage results. Thus, the consumer would have the choice of consuming the product either as a frozen confection or as a carbonated beverage. This is a particularly valuable result in the case of fruit flavored products.

Apparatus for carrying out the method described above is illustrated in the accompanying drawing.

In the drawing:

FIG. 1 is an elevational view of an embodiment of the apparatus of the invention partly broken away and partly diagramatic.

FIG. 2 is a longitudinal sectional view of a portion of the embodiment on a larger scale.

FIG. 3 is a sectional view along the line 3—3 of FIG. 2.

FIG. 4 is a sectional view along the line 4—4 of FIG. 2.

FIG. 5 is a sectional view along the line 5—5 of FIG. 2.

Referring to the drawing with more particularity, the apparatus illustrated therein comprises a cylindrical mixing chamber 11 having an inlet 12 and an outlet 13. Between the inlet and the outlet an opening 14 in the wall of the chamber communicates with a diverticulum 15 of the chamber 11. The diverticulum includes a coupling flange 16 at its outer end. A tubular gas injector 17 extends axially through the diverticulum and terminates within the chamber 11. An outlet opening 18 is positioned on one side to face downwardly towards the outlet 13 of the chamber 11 and is positioned substantially axially thereof. The injector 17 is provided with a coupling flange 19 which acts as a cantilever support for the injector and also as the end wall of the diverticulum 15. It is adapted to be coupled to the flange 16 with a conventional form of flange clamp 20. Similar flange clamps 21 and 22 connect the flange 23 of the inlet 12 with the flange 24 of a mix feed pipe 25 and the flange 26 of outlet 12 with the flange 27 of an outlet conduit 28, respectively. These facilitate rapid dismantling and assembly for cleaning.

A gas outlet member comprises an elongated stem 27 which is threadedly engaged at one end with the opening 18 of the injector 17. The opposite end of the stem 29 carries a nozzle 30 having a large group of exceedingly fine outlet openings 31 facing downwardly. The feed pipe 25 is connected to a source (not shown) of semi-fluid mix 32 under pressure to be gasified. This material enters the mixing chamber 11 and flows around the stem 29. The gas to be added to the mix is contained in a tank 33 under pressure and passes from the tank through a conventional solenoid valve 34, then through a conventional pressure regulator 35, conventional flowmeter 36, and a conventional check valve 37. All these conventional elements are arranged in the matter shown in the drawing to maintain a constant pressure and prevent backward flow through the nozzle. The mix 32 is chilled by any conventional means (not shown) prior to delivery into the mixing chamber 11. As the mix flows through the chamber 11 the gas is exhausted through the openings 31 directly into and confluently with the mix passing around the stem 29 and nozzle 30. The combined gas and mix pass from the outlet 13 into the conduit 28. It may then be processed by means conventional in ice cream manufacture (whipping, freezing, etc.) and finally packed in individual containers 38.

The resulting product contains the gas in a uniform dispersion and in such a manner that when a heavy gas, such as carbon dioxide is used, it is retained in the product to a greater extent than when ordinary air is used in conventional methods.

These means and method also make it possible to provide a frozen confection with lower sugar quantities than prior types of frozen confections and yet retain a satisfactory level of flavor.

This is illustrated by the following examples of mixes suitable for the invention and in which the sugar content is in the range of 22 to 29% by weight. Also corn syrup solids are in the range of 0 to 10% by weight; whipping aids in the range of 0.1% to 2.0%; and gums in the range of 0.05 to 0.5%, all of which are substantial departures from mixes possible with conventional methods and means and provide a new concept in the formulation of frozen dessert products:

Example 1

| | Percent |
|---|---|
| Sugar | 24 |
| Corn syrup solids | 6 |
| Guar gum | 0.10–0.30 |
| Frozen egg whites | 2 |
| Orange juice | 2 |
| Citric acid | 0.3 |

Balance of mix is water.

Example 2

| | |
|---|---|
| Sugar | 24 |
| Corn syrup solids | 6 |
| Carboxymethyl cellulose | 0.10–0.40 |
| Frozen egg whites | 2 |
| Citric acid | 0.3 |
| Raspberry puree | 6 |

Balance of mix is water.

Example 3

| | |
|---|---|
| Sugar | 29 |
| Propylene glycol alginate | 0.10–0.50 |
| Citric acid | 0.3 |
| Pineapple juice | 6 |

Balance of mix is water.

Example 4

| | |
|---|---|
| Sugar | 25 |
| Corn syrup solids | 5 |
| Soya proteins | 0.10–0.50 |
| Guar gum | 0.10–0.20 |
| Carboxymethyl cellulose | 0.10–0.20 |

Balance of mix is water.

Example 5

| | |
|---|---|
| Sugar | 22 |
| Corn syrup solids | 10 |
| Karaya gum | 0.5 |
| Citric acid | 0.3 |
| Lime juice | 2 |

Balance of mix is water.

All parts indicated in the above formulations are by weight.

What is claimed is:

1. The method of manufacturing a frozen confection comprising preparing a conventional chilled mix and moving it unidirectionally in the form of a stream through a treatment zone, introducing into the stream, in the treatment zone, a quantity of gas with which the mix is to be gasified, said gas being introduced in finely divided streams, directly into and confluently with the mix passing through the zone, whereby the distribution of the gas in the mix is uniform throughout and is retained therein in finely divided form, then freezing the gasified mix.

2. The method as defined by claim 1 in which the molecular weight of the gas is substantially greater than the molecular weight of air.

3. The method as defined by claim 1 in which the gas is carbon dioxide.

4. The method as defined by claim 1 in which the gas is nitrous oxide.

5. The method as defined by claim 1 and means for controlling the flow of the mix through the zone and independent means for controlling the flow of gas into the zone.

References Cited

UNITED STATES PATENTS

| | | | |
|---|---|---|---|
| 2,713,253 | 7/1955 | Chandler | 99—136 XR |
| 3,068,105 | 12/1962 | Morrison | 99—136 |
| 3,256,100 | 6/1966 | Bernstein et al. | 99—136 |

A. LOUIS MONACELL, Primary Examiner

J. M. HUNTER, Assistant Examiner